United States Patent
Kim et al.

(10) Patent No.: US 6,795,287 B2
(45) Date of Patent: Sep. 21, 2004

(54) STATIC EXCITATION SYSTEM HAVING CAPABILITY OF ELIMINATING SHAFT VIBRATIONS OF A GENERATOR AND OVERVOLTAGE WHEN UNDEREXITED

(75) Inventors: Chan Ki Kim, Daejeon (KR); Hong Woo Ryu, Daejeon (KR); Jin Yang No, Gwangju (KR); Bo Soon An, Jeju-si (KR); Seok Jin Lee, Gwacheon-si (KR); Jin Cheol Shin, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 0 days.

(21) Appl. No.: 10/342,487

(22) Filed: Jan. 15, 2003

(65) Prior Publication Data

US 2004/0085051 A1 May 6, 2004

(30) Foreign Application Priority Data

Oct. 30, 2002 (KR) .................................. 10-2002-0066545

(51) Int. Cl.⁷ .......................... H02H 11/00; H02H 7/06
(52) U.S. Cl. .......................... 361/109; 361/21; 361/19; 318/798; 310/149
(58) Field of Search .......................... 361/18, 19, 21, 361/109, 113, 30, 42; 318/716, 759, 800, 798; 310/194, 180, 149, 217; 322/25, 37; 376/146, 156

(56) References Cited

U.S. PATENT DOCUMENTS

| | | | | |
|---|---|---|---|---|
| 3,924,141 A | * | 12/1975 | Yannone et al. | 290/40 R |
| 4,331,994 A | * | 5/1982 | Wirth | 361/56 |
| 5,157,574 A | * | 10/1992 | Tuusa | 361/56 |
| 5,291,106 A | * | 3/1994 | Murty et al. | 318/375 |
| 5,923,141 A | * | 7/1999 | McHugh | 318/701 |

* cited by examiner

*Primary Examiner*—Rajnikant B. Patel
(74) *Attorney, Agent, or Firm*—Cantor Colburn LLP

(57) ABSTRACT

A static excitation system that can eliminate shaft vibrations of a generator and overvoltage when it is underexited is provided. The static excitation system includes an initial excitation equipment; a step-down transformer; a 3-phase diode bridge; a boost chopper provided with a transistor and a resister, and maintaining DC voltage to be constant; a DC chopper provided with a plurality of transistors and diodes, and supplying DC power to a rotor of a generator; a boost controller for controlling the boost chopper; and a DC chopper controller for controlling the DC chopper, wherein, overvoltage applied on the excitation system when underexcited is eliminated owing to the boost chopper preventing any changes at an output terminal of the generator from being transferred to the excitation system, and maintaining the excitation DC voltage to be constant; and also owing to the DC chopper which is capable of 4 quadrant operation, hereby pole slipping of the generator can be prevented.

7 Claims, 3 Drawing Sheets

400; US 6,795,287 B2

STATIC EXCITATION SYSTEM HAVING CAPABILITY OF ELIMINATING SHAFT VIBRATIONS OF A GENERATOR AND OVERVOLTAGE WHEN UNDEREXITED

BACKGROUND OF THE INVENTION

1. Field of the Invention

The present invention relates to a static excitation system that can eliminate shaft vibrations of a generator and overvoltage when it is underexited. More specifically, the present invention relates to a static excitation system that can eliminate shaft vibrations of a generator and transient phenomena generated in a prior art, so that the present invention can be applied in a field in which the excitation system has a great importance in an isolated system or a weak system.

2. Description of the Related Art

According to prior arts, generators having a small capacity have been used to produce excited voltage, since techniques for generating high power had not been developed enough. However, as development techniques for a semiconductor device are advanced, a thyristor is used to receive power from an output terminal of a generator and supply excited power of the generator instead of the generator having a small capacity as shown in FIG. 1.

Since the generator having a small capacity is not used in the aforesaid system embodying the thysristor, it has some advantages, such as quick response and broad control area. However, when voltage of an output terminal of a generator has dropped, power supply of the excitation system is also dropped, and when output of the generator is increased by regulating the phase of the thyristor provided in the excitation system, output of the generator is increased again, thereby these steps are repeated again, i.e., output of the generator is dropped again by regulating the phase of the thyristor, and thereby vibrations of the output voltage of the generator could be arisen by the repeated steps.

At this time, nonlinear characteristics of a current limiter or the system itself have been contained in operating features of an excitation controller. When the vibrations of output voltage of a generator coincide with mechanical resonance frequencies of a generator-turbine system, vibrations of output voltage of a generator are changed to resonance, wherein the resonance means that output voltage of a generator is gradually increased. Finally, since the resonance may incur a damage on a shaft of the generator-turbine, it is needed to prevent that the output voltage of the generator influences control characteristics of the excitation system.

FIG. 1 is a diagram illustrating voltage control system of a generator using a conventional thyristor. FIG. 1a is a diagram illustrating a static excitation system using the conventional thyristor, and FIG. 1b shows a construction of a rotational excitation system using the thyristor in which direct current is supplied to a rotor (field magnet) using a thyristor converter 12 from an output terminal of a generator 14 via a step-down transformer 11. There are 6 thyristors A–C and A'–C' in the converter 12, which are controlled by gate signals of a controller 13.

According to FIG. 1b, AC power is generated by PMG (permanent magnetic generator; 15) and transformed into DC power via a thyristor converter 16. Direct current is then supplied to a field magnet of an auxiliary generator (excitation type generator; 18) to control the voltage of the auxiliary generator 18. Output of the auxiliary generator 18 supplies direct current to a field magnet of a main generator 14 via a diode bridge 17 to control the voltage of the main generator 15.

In case that excitating current is dropped to drop down the voltage of a generator, since the thyristor type excitation system shown in FIG. 1, owing to the characteristics of the thyristor, can flow current in just one direction, overvoltage is generated by discriminator current, and the overvoltage make a damage on the excitation system. If the exiting current also can flow in a contrary direction, the overvoltage could be eliminated.

As shown in the FIG. 1a, in the static excitation system using the conventional thyristor, an ignition angle of a thyristor constituting a thyristor bridge after excitation power is inputted from the output terminal of the generator 14 to control exciting current which is supplied to a field magnet of a synchronous generator. Thereby the terminal voltage of the synchronous generator is maintained in constant.

The static excitation system has some advantages that it is convenient to construct and also easy to maintain. However, The properties of the excitation system are directly affected by the changes of the output voltage of the synchronous generator because that excitation AC power is supplied from the terminal of the synchronous generator. One of the problems which may be caused by that the output terminal of the generator is directly connected to the excitation system, is that input of the excitation system is decreased according to reduction of the terminal voltage of the generator and therefore, the excitation system should conduct an operation for increasing the output of the generator in order to enhance the output of the generator.

This operation results resonance (vibrations) of the output voltage of the generator. The resonance (vibrations) is more frequently happened in a system having properties of high gain or quick response. If the resonance corresponds with mechanical resonance frequency of the generator, a shaft of a generator-turbine system could be broken. Accordingly, It is need to implement a controller which is designed considering the shaft vibrations of the generator-turbine system and a PSS (power system stabilizer) eliminating the frequencies of the shaft vibrations of the generator-turbine system in the excitation system. However it is difficult to implement the aforesaid strategy, and hard to satisfy all requirements because the frequencies of the shaft vibrations are not one fixed value but having a several different values.

Since the excitation system using a thyristor can flow current in one direction, in a system in which a condenser bank is provided or a system having Ferranti's effect, i.e., voltage of a receiving end becomes higher than that of a sending end, continuous reducing of the terminal voltage may cause that the voltage applied on a rotor of the generator becomes to be discontinuous or the current becomes zero. At this time, since the rotor of the generator has a high inductance, overvoltage (V=L; di/dt) is applied on the both terminals of the thyristor by the discontinuous current instantly so that it makes a damage on the excitation system of the generator. In order to prevent this overvoltage, it contains a reverse resistor or a crowbar circuit. However, since degree and duration of the overvoltage is differed according to the properties of the system, it is hard to adjust. Otherwise, if the current flows in both directions not only one direction, the overvoltage is disappeared in the system and pole slipping can be prevented or delayed.

SUMMARY OF THE INVENTION

The present invention intends to improve disadvantages of a conventional excitation systems using GTO (gate turn off thyristor) or IGBT (insulator gate bipolar transistor), or a conventional thyristor type excitation systems, i.e., preventing shaft vibrations of a generator which can be generated in a static excitation system having high gain property and overvoltage which may produced in a system having one directional current continuity.

The present invention is a novel static excitation system of a synchronous generator controlling terminal voltage of the synchronous generator in a power plant. The present invention solves the problem related with shaft vibrations which may produced in a static excitation system having a properties of quick response and high gain in order to supply exciting current rapidly, which is needed to a generator when an output terminal of the generator shows an extraordinary phenomena or gets out of order. Furthermore, the present invention also solves the problem related with overvoltage of a system which may produced in a low excitation condition in a long distance line causing Ferranti's effect or in a case that it is connected to HVDC (high voltage direct current).

The purpose of the invention is accomplished by an excitation system comprising:

an initial excitation equipments;

a step-down transformer;

a 3-phase diode bridge;

a boost chopper provided with a transistor and a resister, and maintaining DC voltage to be constant;

a DC chopper provided with a plurality of transistors and diodes, and supplying DC power to a rotor of a generator;

a boost controller for controlling the boost chopper; and a DC chopper controller for controlling the DC chopper, wherein, overvoltage applied on the excitation system when underexcited is eliminated owing to the boost chopper preventing any changes at an output terminal of a generator from being transferred to the excitation system, and maintaining the excitation DC voltage to be constant; and also owing to the DC chopper which is capable of 4 quadrant operation, thereby pole slipping of a generator can be prevented.

DETAILED DESCRIPTION OF THE INVENTION

Hereinafter, a preferred embodiment of the present invention will be described in detail with reference to the accompanying drawings.

Figure 1A:
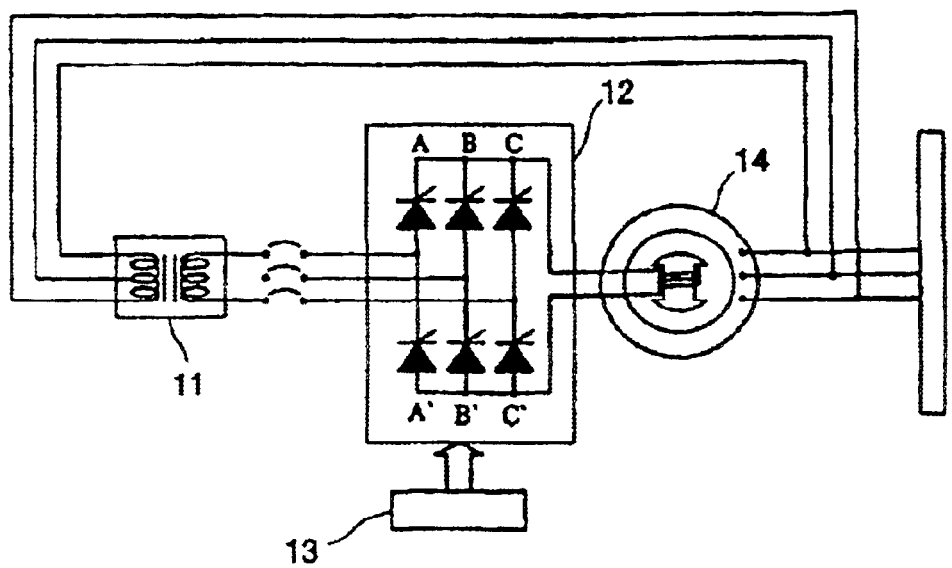
FIGS. 1a and 1b are diagrams illustrating a voltage control system of a generator using a conventional thyristor.
Figure 1B:
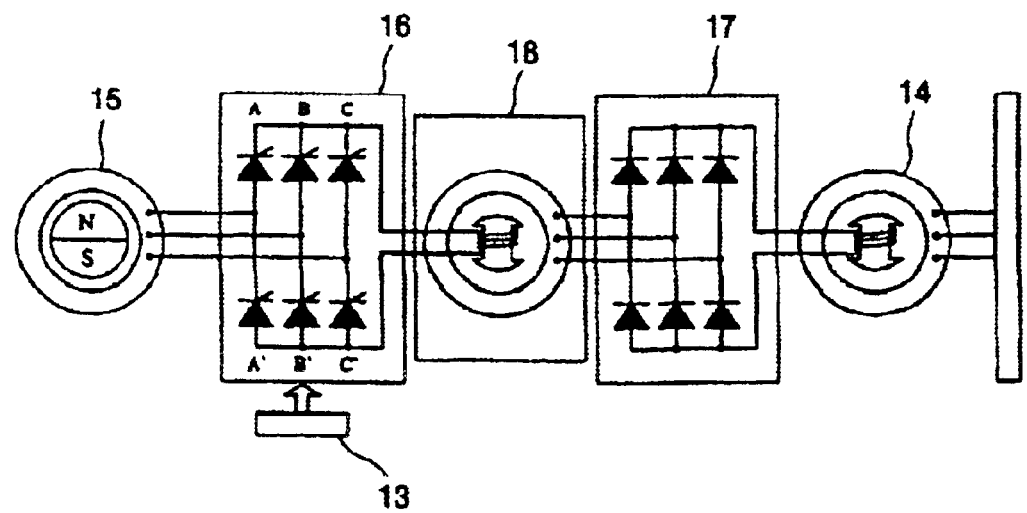

FIG. 2 shows a construction of an excitation system according to the embodiment of the present invention. This excitation system is similar in structure to the system illustrated in FIG. 1a. However, unlike the system of FIG. 1a, the excitation system of FIG. 2 prevents any changes at the output terminal of a generator from being transferred to the excitation system. Also, since this excitation system includes a boost chopper for maintaining excitation DC voltage to be constant and a DC chopper capable of a 4-quadrant operation, this excitation system can eliminate any overvoltage applied thereto, and which does not cause a pole slipping.

Figure 2A:
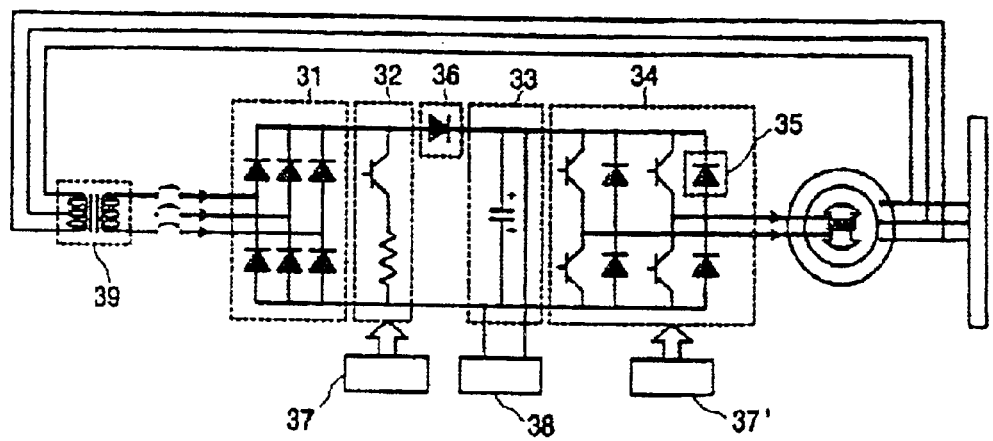
FIGS. 2a and 2b are diagrams illustrating a construction of an excitation system of a generator according to an embodiment of the present invention.
Figure 2B:
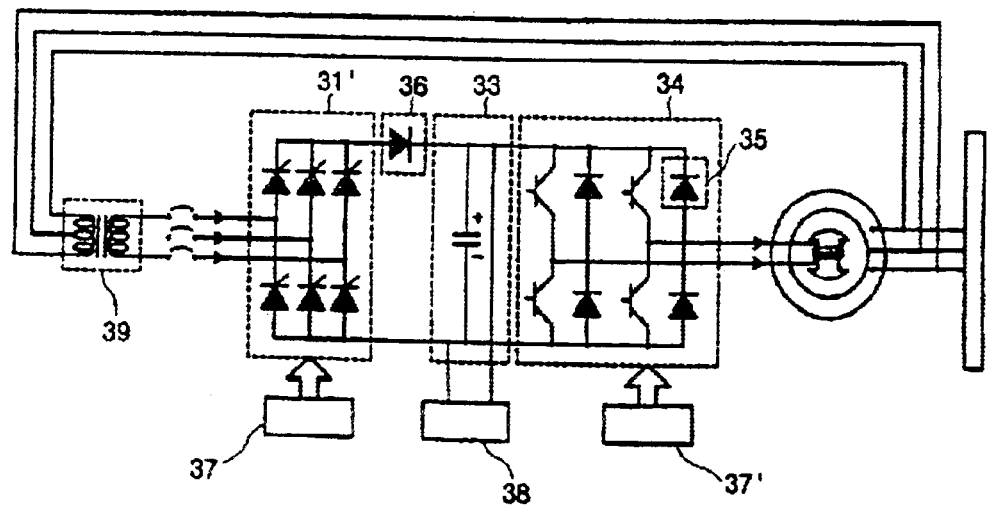

Although the excitation system illustrated in FIG. 2b is slightly different in structure from that illustrated in FIG. 2a, it has the same function as can be performed by the system of FIG. 2a, because an AC/DC converter has capability of boosting itself.

An excitation system according to the present invention can eliminate shaft vibrations of a generator and overvoltage generated when underexcited. As shown in FIG. 2, the excitation system comprises an initial excitation means, a step-down transformer 39 for an excitation system, a 3-phase diode bridge 31, a boost chopper 32 for maintaining DC voltage to be constant, and a DC chopper 34 for supplying a DC power to a rotor of a generator. The excitation system further comprises a boost controller 37 for controlling the boost chopper 32 and a DC chopper controller 37' for controlling the DC chopper 34. A battery 38 is connected to an excitation condenser 33. Also, the boost chopper 32 comprises a transistor and a resistor.

Referring to FIG. 2a, the power of the output terminal of the generator is supplied to the excitation system through the step-down excitation transformer 39. At this time, 3-phase AC voltage applied via the excitation transformer 39 is converted into DC voltage via the diode bridge 31, and charged to the excitation condenser 33. If the voltage of the condenser 33 fluctuates due to an accident in the system or any other reason, the excitation system will maintain the DC voltage to be constant by switching the boost chopper 32. When the boost chopper 32 is on, it causes a momentary short-circuit on the output terminal of the diode bridge 31, and thereby the output terminal of the diode bridge 31 is instantaneously induced. When the boost chopper 32 is off, overvoltage is instantaneously applied to the DC voltage terminal based on V=L di/dt operation.

Applied overvoltage is charged to the DC condenser 33 via a backflow-preventing diode 36. Such an operation of the boost chopper 32 can maintain the DC voltage of the condenser 33 to be constant. In addition, the DC chopper 34, comprising a plurality of diodes and transistors, supplies constant DC voltage of the condenser 33 to the rotator of the generator. The DC chopper 34 enables forward and backward flow of current using a free wheeling diode 35.

DC voltage of the condenser 33, which is controlled by the boost chopper 32, prevents the excitation system from being affected by the output terminal of the generator. The DC voltage prevents resonance generated when vibrations occur due to shaft vibrations of the output terminal of the generator or due to any other operation. Also, the DC chopper 34 enables forward and backward flow of current, thereby preventing an instantaneous overvoltage surge caused by discontinuous current flow when only a conventional thyristor is used.

FIG. 2b illustrates an excitation system slightly different in structure from the system illustrated in FIG. 2a. Although the system of FIG. 2b uses a 3-phase diode bridge 31' instead of the boost chopper 32 and the diode bridge 31 in the system shown in FIG. 2a, it has the same function as the system of FIG. 2a. However, the system of FIG. 2b is different from that of FIG. 2a in that six switching elements are equally charge in switching surges and deteriorations.

Figure 3:
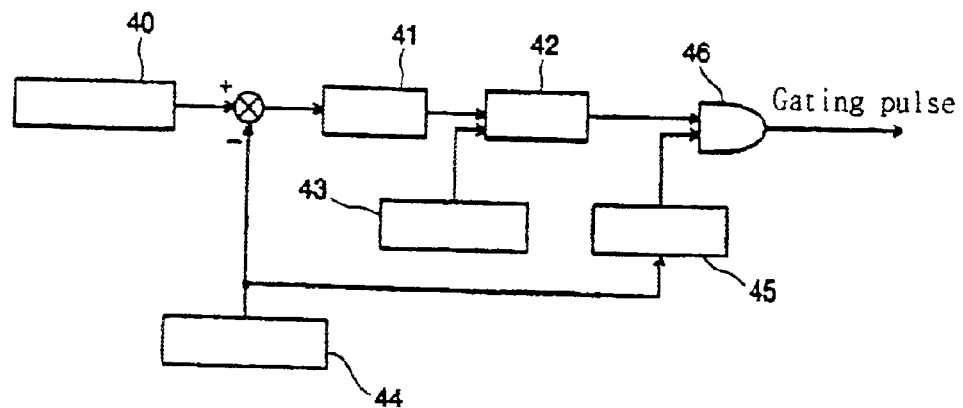
FIG. 3 is a block diagram of a boost chopper controller shown in FIGS. 2a and 2b.

FIG. 3 illustrates in detail the controller 37 of the boost chopper of FIG. 2, which is similar to a conventional chopper controller. The controller 37 controls DC voltage to be constant. Since the boost chopper can be on/off operated, the controller 37 is switched by PWM (pulse width modulation).

The boost chopper controller comprises a DC voltage nominal value 40, an actual DC voltage detecting section 44, a PI controller 41, a triangle wave generator 43, a comparator 42, a signal latch 45 and an end gate 46. First, the boost DC voltage controller generates an error signal from a difference between the DC voltage nominal value 40 and the actual DC voltage, modulates the phase and the size of the signal through the PI controller 41, and compares the modulated phase and size with the triangle wave generator 43 to generate an on/off signal. The generated on/off signal is assembled into the output of the on/off signal latch 45 and the end gate 46 in order to ignite the transistor of the boost chopper or a GTO or IGBT driving section. The signal latch 45 detects the actual DC voltage. If overvoltage that may cause damage to equipments is applied to the system, the signal latch 45 maintains a gating signal of the end gate 46 in an on/off mode. The signal latch, consisting of flip-flops, is generally termed a "latch."

Figure 4:
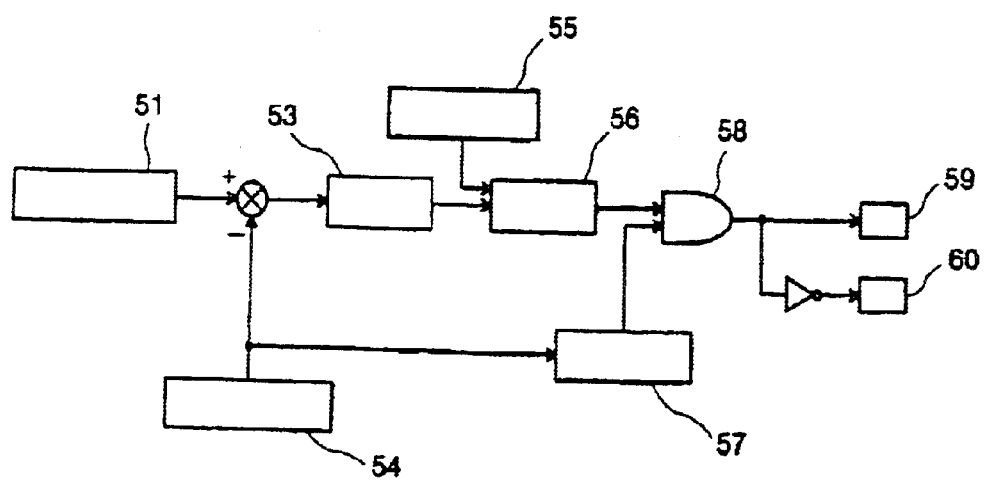
FIG. 4 is a block diagram of a DC chopper controller shown in FIGS. 2a and 2b.

FIG. 4 is a block diagram of the DC chopper controller of FIG. 2, which is configured same as a conventional 4-quadrant DC chopper controller. The DC chopper controller controls direct current to be constant. Since the DC chopper can be on/off operated, the DC chopper controller is switched by PWM (pulse width modulation) method.

The DC chopper controller comprises a DC voltage nominal value 51, an actual DC voltage detecting section 54, a PI controller 53, a triangle wave generator 55, a comparator 56, a signal latch 57 and an end gate 58. First, the DC chopper controller generates an error signal from a difference between the DC voltage nominal value 51 and the actual DC voltage, modulates the phase and the size of the signal through the PI controller 53, and compares the modulated phase and size with the triangle wave generator 55 to generate an on/off signal. The generated on/off signal is assembled into the output of the on/off signal latch 57 and the end gate 58 in order to ignite the transistor of the DC chopper or a GTO or IGBT driving section.

The signal latch 57 detects the actual DC voltage. If overvoltage that may cause damage to equipments is applied to the system, the signal latch 57 maintains a gating signal of the end gate 58 in an on/off mode. The signal latch, consisting of flip-flops, is generally termed a "latch." This DC chopper controller is different from the boost chopper controller of FIG. 3 in that its nominal value is not voltage but current, and in that it requires four pulses for driving four semiconductor devices. However, as the DC chopper should gate an upper element and a down element in turn, it actually requires only two opposition on/off signals. Therefore, the output of the DC chopper controller requires a bidirectional gating circuit which generates a signal 59 for applying voltage in the forward direction and a signal 60 for applying voltage in the backward direction.

In a normal operation condition, the static excitation system of the present invention has the same operational characteristics as that of a general static excitation system. However, a conventional excitation system deteriorates resonance of the system when a resonant frequency is applied to the system, due to systemic extraordinary phenomena. The excitation system of the present invention improves such a drawback of the conventional excitation system. Also, the present invention can improve the conventional excitation system having the problem that overvoltage may be caused by current discontinuity.

The present invention provides a novel static excitation system of a synchronous generator, which controls terminal voltage of the synchronous generator in a power plant. The present invention can eliminate shaft vibrations which may occur in a static excitation system provided with quick response and high gain in order to rapidly supply excitation current required by a generator when an output terminal of the generator is out of order or is in abnormal condition. Also, the invention can solve a problem of overvoltage caused when the system is connected to a HVDC terminal or underexcited in a long distance line causing Ferranti's effect.

What is claimed is:

1. A static excitation system having a capability of eliminating vibrations of a generator and overvoltage when underexcited comprising:

an initial excitation equipment;

a step-down transformer;

a 3-phase diode bridge;

a boost chopper provided with a transistor and a resister, and maintaining DC voltage to be constant;

a DC chopper provided with a plurality of transistors and diodes, and supplying DC power to a rotor of a generator;

a boost controller for controlling the boost chopper; and a DC chopper controller for controlling the DC chopper, wherein overvoltage applied on the excitation system when underexcited is eliminated owing to the boost chopper preventing any changes at an output terminal of the generator from being transferred to the excitation system, and maintaining the excitation DC voltage to be constant; and also owing to the DC chopper which is capable of 4 quadrant operation, thereby pole slipping of the generator can be prevented.

2. The static excitation system having a capability of eliminating vibrations of a generator and overvoltage when underexcited according to claim 1, wherein:

a DC condenser and a diode preventing backflow are provided between the boost chopper and the DC chopper; and current can flow to the DC chopper via a free wheeling diode in forward and backward.

3. The static excitation system having a capability of eliminating vibrations of a generator and overvoltage when underexcited according to claim 1, wherein:

the boost chopper and the diode bridge are assembled into a 3-phase converter, so that all of the 6 switching devices are in charge of switching surges or deteriorations evenly.

4. A static excitation system having a capability of eliminating vibrations of a generator and overvoltage when underexcited comprising:

a boost chopper controller which is provided with a nominal value of DC voltage, detecting means for actual DC voltage, PT controller, a triangle wave generator, a comparator, a signal latch and an end gate to control the DC voltage to be constant, wherein the switching is accomplished in a pulse width modulation (PWM) method since the boost chopper is capable of on/off operations.

5. A static excitation system having a capability of eliminating vibrations of a generator and overvoltage when underexcited comprising:

a DC chopper controller including which is provided with a nominal value of direct current, detecting means for actual direct current, PI controller, a triangle wave generator, a comparator, a signal latch and an end gate to control the direct current to be constant, wherein the switching is accomplished in a pulse width modulation (PWM) method since the DC chopper is capable of on/off operations.

6. The static excitation system having a capability of eliminating vibrations of a generator and overvoltage when underexcited according to claim 4, wherein the signal latch comprises flip-flops and maintains the gating signals of the end gate in an off mode when overvoltage is applied on the system.

7. The static excitation system having a capability of eliminating vibrations of a generator and overvoltage when underexcited according to claim 5, wherein the signal latch comprises flip-flops and maintains the gating signals of the end gate in an off mode when overvoltage is applied on the system.

* * * * *